United States Patent

Breen

[15] 3,675,249
[45] July 11, 1972

[54] FLUSH VALVE ASSEMBLY

[72] Inventor: William J. Breen, 456 Lewis Place, Mineola, N.Y. 11501

[22] Filed: June 11, 1970

[21] Appl. No.: 45,370

[52] U.S. Cl. ........................................... 4/57 P, 4/57
[51] Int. Cl. ............................................. E03d 1/34
[58] Field of Search ........................ 4/57, 57 P, 67, 67 A

[56] References Cited

UNITED STATES PATENTS

| | | | |
|---|---|---|---|
| 2,781,520 | 2/1957 | Micek | 4/57 P |
| 2,754,522 | 7/1956 | Earsley | 4/57 P |
| 3,005,991 | 10/1961 | Richardson et al. | 4/57 P |
| 3,072,919 | 1/1963 | Roach | 4/57 P |
| 3,142,846 | 8/1964 | Lackenmaier et al. | 4/57 P X |
| 3,154,794 | 11/1964 | Antunez, Jr. | 4/57 P |
| 3,167,787 | 2/1965 | Connealy | 4/57 P X |
| 3,239,848 | 3/1966 | Zrolka | 4/57 P |
| 3,368,224 | 2/1968 | Ament | 4/57 P |

*Primary Examiner*—Henry K. Artis
*Attorney*—Frederick M. Gibson

[57] ABSTRACT

The present invention comprises a unitary flush valve assembly for use in the flush tanks of toilets and the like which combines effective valve sealing with low cost of manufacture and ease of installation. The valve assembly consists of a horizontal arm adjustably supporting the valve closure member at one end and having the other end bifurcated to establish a hinged connection with a supporting member mounted on the overflow pipe. Means are also provided to permit operation in tanks having canted valve seats, as well as means for adapting the supporting member to accommodate various sizes of overflow pipes.

2 Claims, 4 Drawing Figures

PATENTED JUL 11 1972 3,675,249

FLUSH VALVE ASSEMBLY

BACKGROUND OF THE INVENTION

Flush valve assemblies have been known and used for many years in connection with outlet valves for toilet flush tanks and the like. To achieve the optimum design, a flush valve assembly should combine the basic elements of effective sealing to prevent leakage, minimum cost of manufacture and facility of installation. While many attempts have been made in the prior art to provide such an optimum design, a need still remains for a low cost flush valve assembly that can be readily installed by unskilled persons and reliably prevent leakage.

Flush tanks are commonly equipped with an outlet fitting in the bottom thereof having a valve seat in the form of a beveled inner edge portion. The valve closure member is usually a hollow, rubber or similarly resilient material ball which is pressed into contact with the valve seat by the weight of the water normally in the tank. An effective valve seal is essential to prevent leakage and the accompanying disturbing sounds which are so annoying during the quiet hours of the night. A common practice in the prior art to solve the leakage problem was to mount a vertical rod extending upwardly from the valve closure member intended to engage guide elements installed on the overflow pipe rising from the bottom of the tank in the immediate vicinity of the outlet fitting so that the valve closure member would be guided to the valve seat.

While such arrangements have resulted in extra cost for the guide elements and a rather difficult installation procedure to ensure proper alignment, experience has shown a tendency for the vertical rod to bind in the guide elements and thereby defeat the intended purpose.

Another approach has been to eliminate the vertical rod and associated guide elements in favor of an integrally molded element supported by the overflow pipe comprising a valve closure member, a hinge and mounting means. However, an effective valve seal requires the use of a soft material for the valve closure member so that the member will conform to irregularities in the valve seat. At the same time, a soft material lacks the resiliency necessary for an effective hinge and thus results in unsatisfactory performance.

Yet another problem in the design of flush valve assemblies is the existence of outlet fittings whose valve seat is canted in the vertical plane. Such an arrangement presents difficulties when the valve seat is located close to the bottom of the tank because of the need to provide the necessary clearance for moving parts to allow proper operation of the assembly.

Still further problems are presented in the design of unitary flush valve assemblies intended to be supported from the overflow pipe since the location of the valve seat in relation to the position of the overflow pipe will vary in particular instances. It is therefore necessary to provide some means whereby the position of the valve closure member relative to the overflow pipe may be readily adjustable in both directions in the horizontal plane.

Therefore, the object of the present invention has been to provide a unitary flush valve assembly capable of effective sealing, low in cost of manufacture and readily installable by unskilled persons.

A particular feature of the invention has been the provision of means whereby the clearance necessary for successful operation with canted valve seats is an integral portion of the assembly.

Another feature of the invention has been the provision of adjustable means to compensate for variations in the relative location of the outlet valve and the overflow pipe supporting the unitary valve assembly.

Since a further problem resides in the fact that overflow pipes may vary appreciably in overall diameter, it has therefore been yet another feature of the invention to provide a flush valve supporting member readily adaptable to a range of overflow pipe diameters.

SUMMARY OF THE INVENTION

The unitary flush valve assembly of the invention comprises a generally horizontally disposed arm, a ball shaped valve closure member, means for adjustably supporting the valve closure member from the arm, a resilient pivot fitting for mounting on the overflow pipe and a hinge pin for interconnecting the arm and the pivot fitting.

The arm is bifurcated at one end to receive the pivot fitting in a spaced relationship to permit adjustment in one direction in the horizontal plane. The other end of the arm has a longitudinal slot as a portion of the means whereby the valve closure member is supported to permit adjustment in the horizontal plane in a direction perpendicular to the direction of the adjustment provided at the pivot fitting. The slotted end of the arm terminates in an upwardly displaced tab to which is attached the pull chain whereby the assembly is operated. The pivot fitting whereby the assembly is supported from the overflow pipe is enlargeable to accommodate various diameters of overflow pipes.

DETAILED DESCRIPTION OF THE INVENTION

Figure 1:
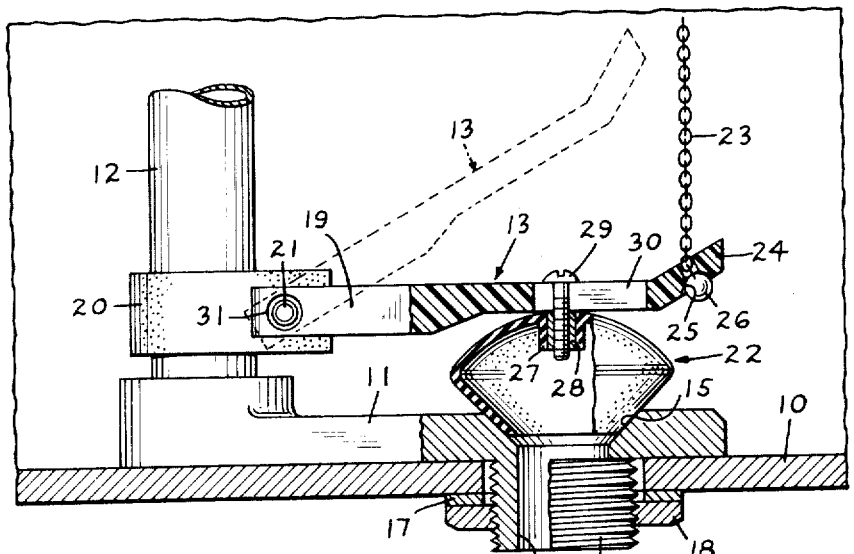
FIG. 1 is a partial cross-sectional view in the vertical plane of a flush tank equipped with the unitary flush valve assembly of the invention.

Referring to FIG. 1, there is shown in partial cross section a portion of the bottom 10 of a flush tank wherein is installed a flush valve unit comprising an outlet fitting indicated generally as 11, an overflow pipe 12 connected thereto in the usual manner and the flush valve assembly of the present invention indicated generally as 13.

The outlet fitting 11 includes a downwardly extending cylindrical passage 14 terminating at the upper end in a beveled inner portion 15 forming a valve seat. Passage 14 is the discharge means for the flush tank and is connected to the sewage system by conventional means not shown. The exterior surface 16 of passage 14 is threaded for mounting in tank bottom 10 by means of a washer 17 and nut 18 in the usual manner. Overflow pipe 12 connects with outlet passage 14 below valve seat 15 by the conventional means of a duct which, as it forms no part of the invention, has been eliminated from the drawing for the sake of simplicity.

The flush valve assembly 13 of the invention consists of a generally horizontal disposed arm 19, a pivot fitting 20 which is joined to arm 19 by a hinge pin 21, a valve closure 22 and a pull chain 23 connected to the usual manually operated external handle not shown. Pull chain 23 is connected to a tab portion 24 of arm 19, upwardly tilted for reasons hereinafter explained, by means of a countersunk hole 25 and a ball 26 arranged to engage the countersunk portion of hole 25. The dashed line portion of the drawings shows the arm in the operated position.

Those skilled in the art will recognize that other means may be employed to connect pull chain 23 to arm 19 as, for example a nylon cord. Furthermore, when overflow pipe 12 is located very close to the outlet passage 14, the assembly 13 can be shortened before installation by rotating fitting 20 through 180° about pin 21. Thus, when the assembly 13 is installed, the overflow pipe 12 will be encompassed by the bifurcated end of arm 19 and pin 21.

Valve closure member 22 is a hollow, generally ball-shaped element constructed of a rubber or similar material of sufficient softness to conform to irregularities in valve seat 15 under the weight of the water normally in the tank and thereby provide an effective seal. At the upper end of member 22, there is formed an internal boss 27 of generally cylindrical shape having molded therein a metallic insert 28 longitudinally threaded to receive screw 29 which passes through a slot 30 in arm 19.

Slot 30 extends lengthwise in arm 19 to provide the means of adjustment to compensate for variations in the distance between the center lines of overflow pipe 12 and outlet passage 14. This adjustment is the only operation in the entire installation procedure requiring the use of tools of any nature. A screwdriver (or small coin) is all that is needed to loosen and then re-tighten screw 29 when the closure member 22 has been moved to the proper location.

Figure 2:
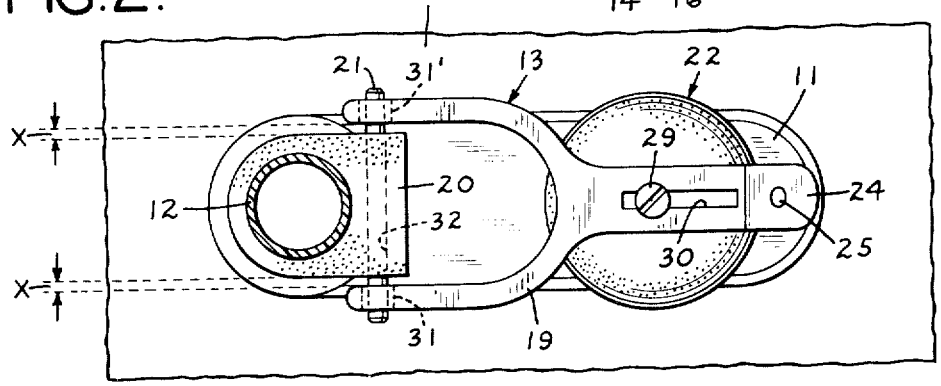
FIG. 2 is a top view of the valve assembly.

As best shown in FIG. 2, the arm 19 is supported from overflow pipe 12 by means of a pivot fitting 20 made of an elastomeric material, as for example, neoprene, having a hardness on the Shore Durometer A scale in the range of 35 to 45. Arm 19 is pivoted from fitting 20 by means of a hinge pin 21 which may be conveniently constructed of a rigid plastic material such as polyvinyl chloride. The pin 21 passes through transverse holes 31 and 31' in the bifurcated end of arm 19 and hole 32 in pivot fitting 20. The holes 31 and 31' are larger than the diameter of pin 21 to provide a free fit thereon while hole 32 of fitting 20 is slightly smaller than the diameter of pin 21, so as to provide a tight fit and thus retain pin 21 securely in position. Ample clearance is provided between the overall width of fitting 20 and the interior span of the bifurcated end of arm 19 as shown at X.

Due to the resiliency of pivot fitting 20, the flush valve assembly 13 is readily installed by pressing fitting 20 manually down overflow pipe 12, without the need for tools of any type, to the proper level in the vertical plane. Whatever adjustments may be needed in the horizontal plane are readily made in one direction by screw 29 as hereinbefore described and, at right angles thereto, by the essentially self-adjusting feature provided through the free fit between pin 21 and holes 31 and 31' in the bifurcated end of arm 19 and the clearance between the overall width of the fitting 20 and the internal span of the bifurcated end of arm 19 which permit arm 19 to be displaced in the right angle direction as necessary to allow valve closure member 22 to freely seat on the beveled inner portion 15.

Figure 3:
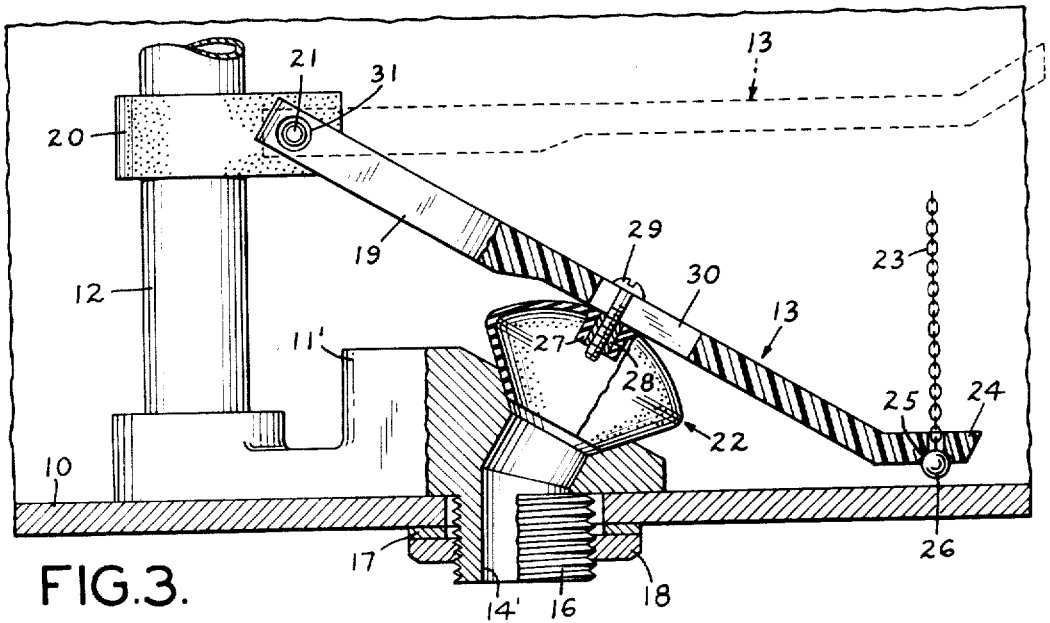
FIG. 3 is a side view showing the installation of the flush valve assembly on a canted valve seat.

In some flush tanks, the plane of the outlet passage 14 interior beveled surface 15 is canted in a direction away from the overflow pipe 12 as shown in FIG. 3 at an angle of approximately 30°. If arm 19 were entirely flat, the pull chain end would interfere with the bottom 10 of the tank and prevent proper closure of the valve. Arm 19 is therefore provided at the pull chain end with a tab portion 24 which is tilted upwardly at an approximate angle of 30° to provide clearance from tank bottom 10 and thus assure satisfactory sealing of the valve.

Figure 4:
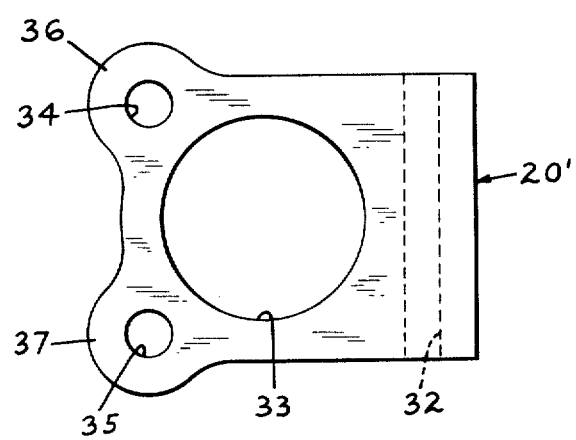
FIG. 4 is an enlarged scale top view of an alternate construction for one of the elements of the flush valve assembly.

Referring now to FIG. 4, there is shown an alternate construction for the pivot fitting 20 designed to permit installation of the flush valve assembly on overflow pipes having substantially different outside diameters. The resiliency of the material from which the pivot fitting 20 is fabricated permits installation thereof on overflow pipes having a small degree of variation in the nominal 1 inch outside diameter. But, when there is a substantial variation as, for instance, from a nominal 1 inch to a nominal 1⅛ or 1¼ inch outside diameter, an alternate construction may be employed to extend the range of usefulness of the device.

The alternate pivot fitting construction, designated as 20', has an overflow pipe receiving hole 33 and the transverse hinge pin hole 32 as hereinbefore described. However, there are now provided a pair of smaller holes 34 and 35 located at approximately 45° angles between the horizontal and vertical centerlines of the pivot fitting 20' and centered within projecting tabs 36 and 37 respectively.

When the fitting 20' is to be installed on a nominal one and ⅛ inch diameter overflow pipe, it is only necessary to use a sharp tool such as a razor blade to slit the thin web of material between hole 33 and one of holes 34 or 35 to effectively increase the diameter of hole 33 to accommodate the larger overflow pipe diameter. When the overflow pipe is of a nominal 1¼ inch diameter, the webs between both holes 34, 35 and hole 33 are cut to provide the desired enlargement of hole 33.

In a typical example, the diameter of hole 33 might be 0.975 inch, the diameters of holes 34, 35 might be one-eighth inch and the thickness of the web between holes 33, 34 and 35 and between holes 33, 34, 35 and the exterior surface might also be one-eighth inch.

What is claimed is:

1. In a flush valve assembly for use with a flush tank having a downward outlet opening and an upstanding overflow pipe, the combination comprising;

a resilient pivot fitting having a first circular passageway for frictional mounting on said overflow pipe and having at least one adjacent circular passageway whereby the effective diameter of said first circular passageway may be enlarged by interconnection with said adjacent passageway, and a generally horizontally disposed arm having a bifurcated end with an internal span and a unitary end, said bifurcated end being adapted for rotational connection to said pivot fitting and said unitary end having a longitudinal slot and a tab, and a hinge pin for connecting said arm to said pivot fitting, and a valve closure member for sealing said outlet opening including means for adjustable connection to said arm, and a pull chain for operating said flush valve assembly including means for connection to said tab of said arm.

2. A flush valve assembly according to claim 1 wherein said pivot fitting is a planar element having a rounded end and a rectangular end, whereby said first circular passageway is normal to said planar element at said rounded end a third circular passageway normal to said planar element located adjacent said first passageway and oppositely disposed from said at least one adjacent circular passageway at said rounded end whereby the effective diameter of said first passageway may be further enlarged by interconnection therewith and a fourth circular passageway at said rectangular end, said fourth passageway being transverse to said planar element and arranged for engagement with said hinge pin.

* * * * *